US006852941B2

(12) United States Patent
Masanori

(10) Patent No.: US 6,852,941 B2
(45) Date of Patent: Feb. 8, 2005

(54) WELDING ROBOTS FOR SPOT WELDING

(75) Inventor: Matzoka Masanori, Nagoya (JP)

(73) Assignee: Kyokutoh Co., Ltd., Nagoya (JP)

( * ) Notice: Subject to any disclaimer, the term of this patent is extended or adjusted under 35 U.S.C. 154(b) by 0 days.

(21) Appl. No.: 10/670,868

(22) Filed: Sep. 25, 2003

(65) Prior Publication Data
US 2004/0149692 A1 Aug. 5, 2004

(51) Int. Cl.$^7$ ............................................... B23K 11/36
(52) U.S. Cl. ..................................... 219/86.25; 901/42
(58) Field of Search ............................. 219/86.25, 86.7, 219/86.51; 409/139, 140; 901/42

(56) References Cited

U.S. PATENT DOCUMENTS 5,445,481 A * 8/1995 Nakajima et al. ........... 409/140
5,545,872 A * 8/1996 Nakajima et al. ............. 219/89

* cited by examiner

Primary Examiner—Clifford C. Shaw
(74) Attorney, Agent, or Firm—Hanley, Flight & Zimmerman, LLC.

(57) ABSTRACT

A welding robot for spot welding is disclosed. The welding robot is capable of grinding electrode tips promptly and clearly. The welding robot 1 includes a servo gun 5 provided at a front end of a multi-joint arm 2, in which a pair of electrode tips for the spot welding are installed, and a control unit 3 for controlling a servo motor 6 of the servo gun in a welding process or a grinding process of the electrode tips. A dresser 18 for grinding the pair of the electrode tips includes a servo motor 27 for rotating a grinding cutter 30. The control unit 3 controls the servo motor 27 of the dresser and controls the servo motor 6 of the servo gun in order to adjust a pressure of the pair of the electrode tips installed in the servo gun with respect to the cutter. In a finishing grinding process of the electrode tips, the speed of revolution of the cutter is increased and the pressure applied to the cutter is reduced relative to the speed and pressure applied in a rough finishing process.

1 Claim, 11 Drawing Sheets

WELDING ROBOTS FOR SPOT WELDING

This application claims the benefit of Japanese Application No. P 2002-279442 filed on Sep. 25, 2002, which is hereby incorporated by reference.

FIELD OF THE DISCLOSURE

The present disclosure relates to welding robots for spot welding, which have a servo gun at a front end of a multi-joint arm.

BACKGROUND

The servo gun includes one pair of electrode tips for spot welding. At least one electrode tip is a kind of welding gun, which is movably installed in a servo motor with a built-in encoder, and has an operation function to perform revolution control/torque control, thereby performing a position control or a pressure control of an electrode tip.

According to a conventional method of grinding an electrode tip of a welding gun, a pair of electrode tips are grinded by contacting both surfaces of a rotating cutter of a dresser for a predetermined time, e.g., 15 seconds. Thereafter, a grinding completion is determined by examining with the naked eye whether a front end surface of each electrode tip is grinded in a predetermined shape.

When grinding each electrode tip, however, it is demanded to grind each tip rapidly and clearly.

DETAILED DESCRIPTION

Figure 1:
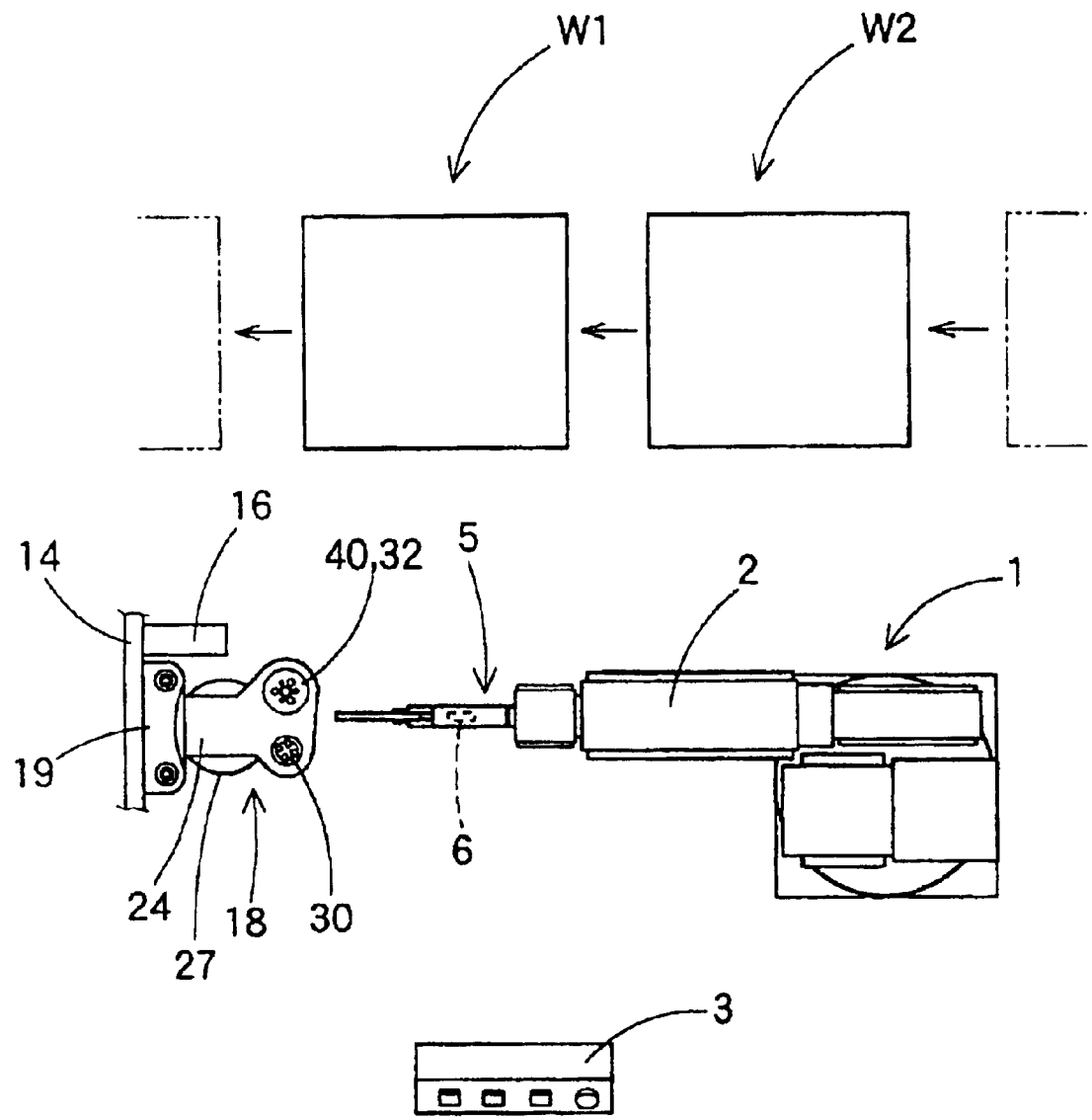
FIG. 1 is a schematic plan view of an example welding robot.
Figure 2:
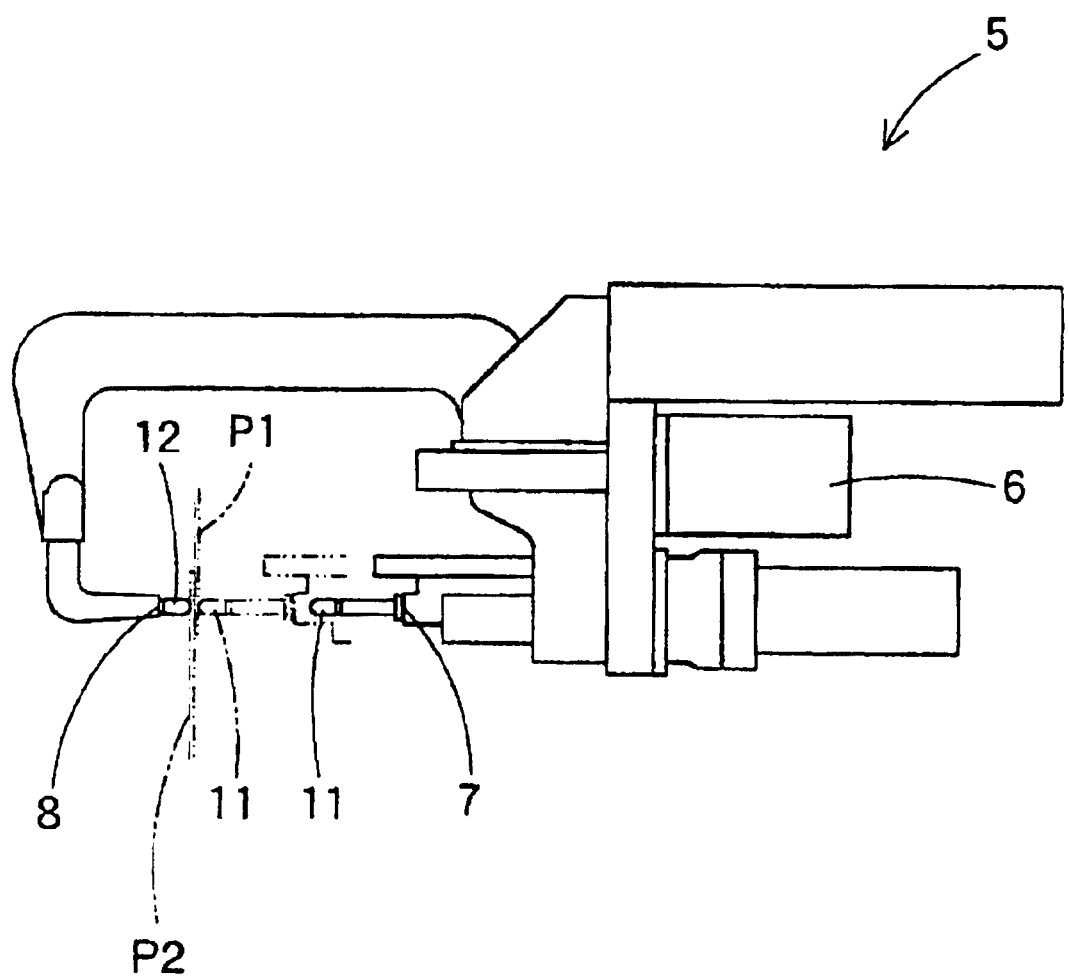
FIG. 2 is a schematic side view of the example servo gun of FIG. 1.
Figure 3:
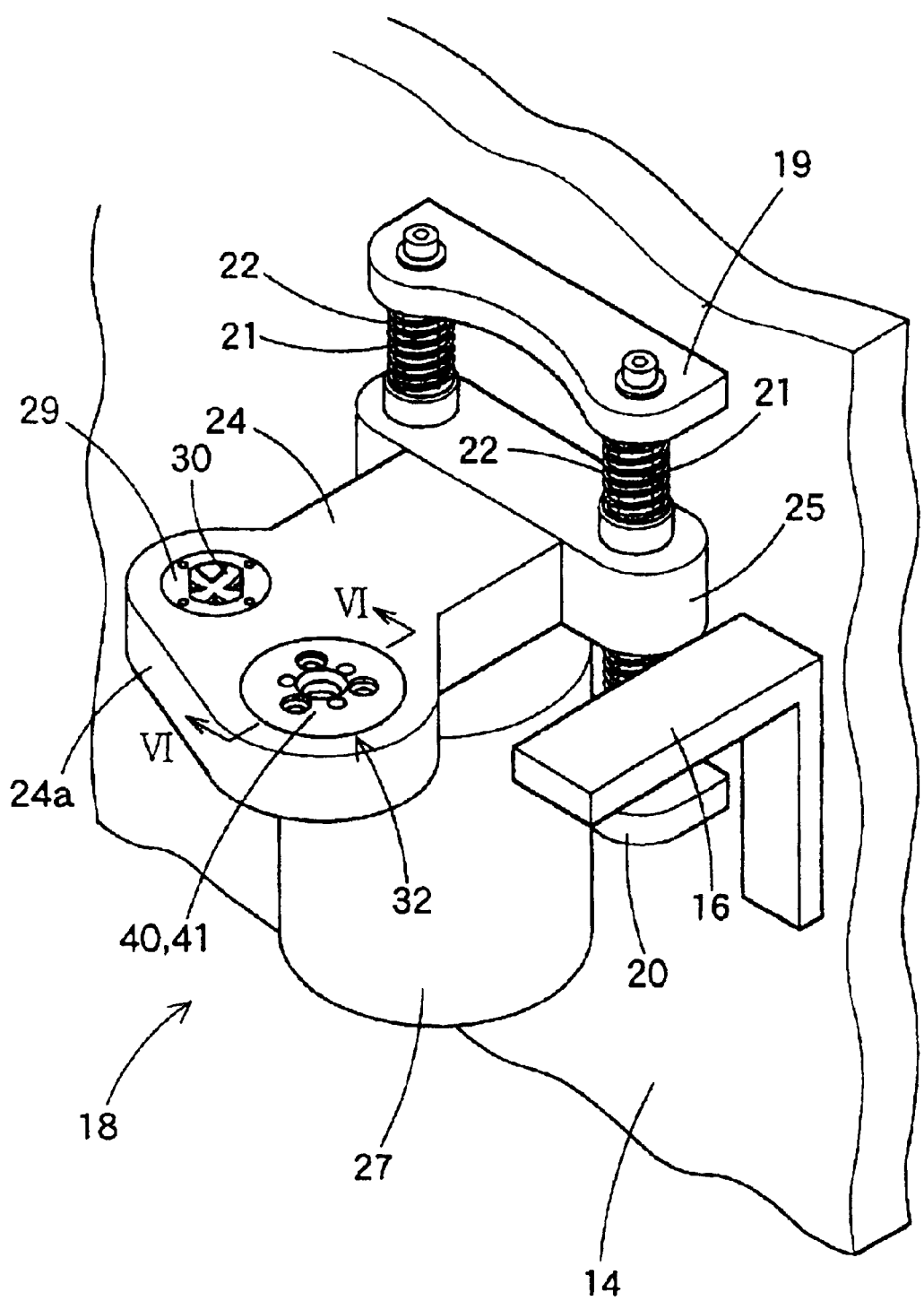
FIG. 3 is a schematic perspective view of the example dresser of FIG. 1.
Figure 4:
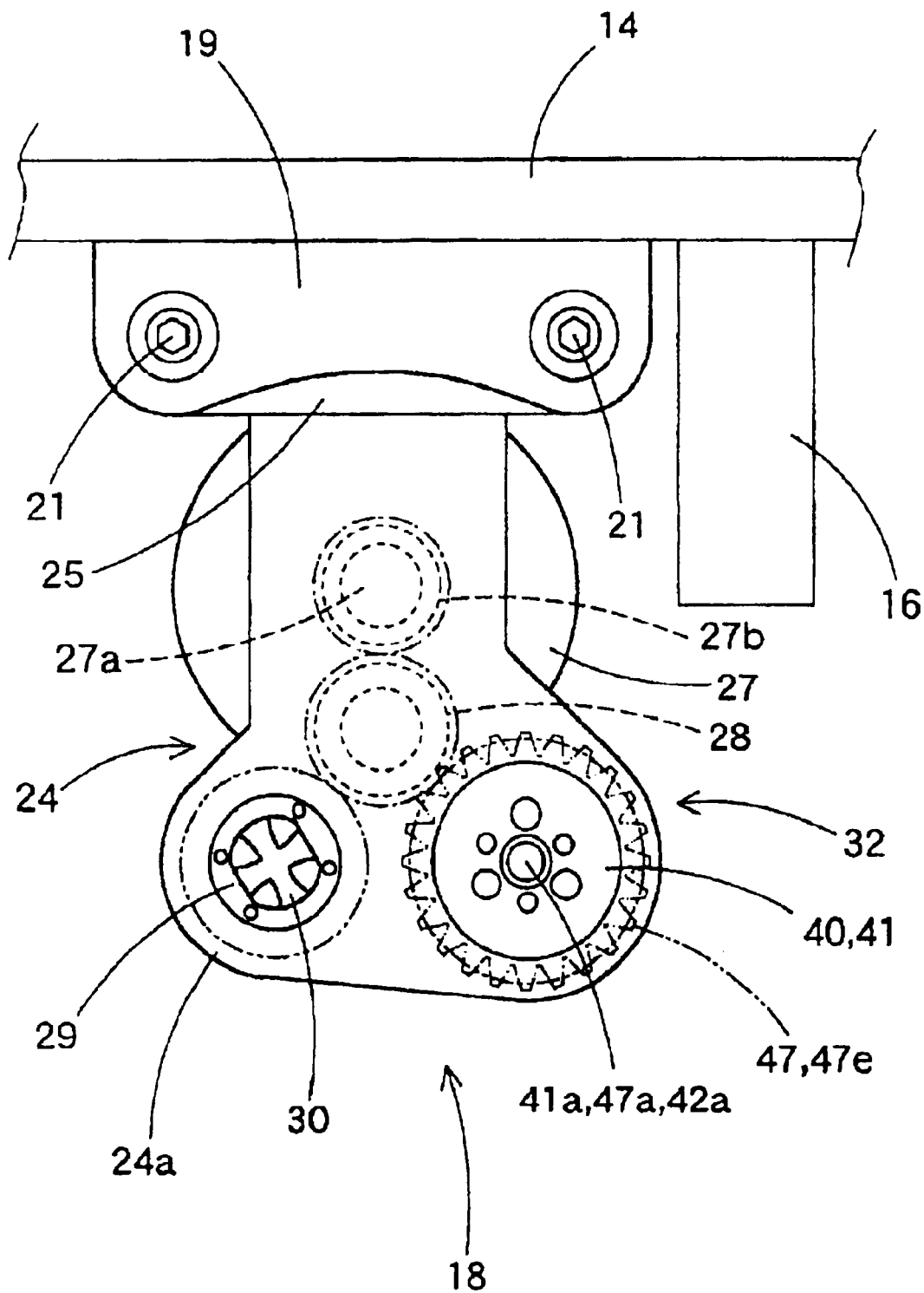
FIG. 4 is a schematic plan view of the example dresser of FIG. 1.
Figure 5:
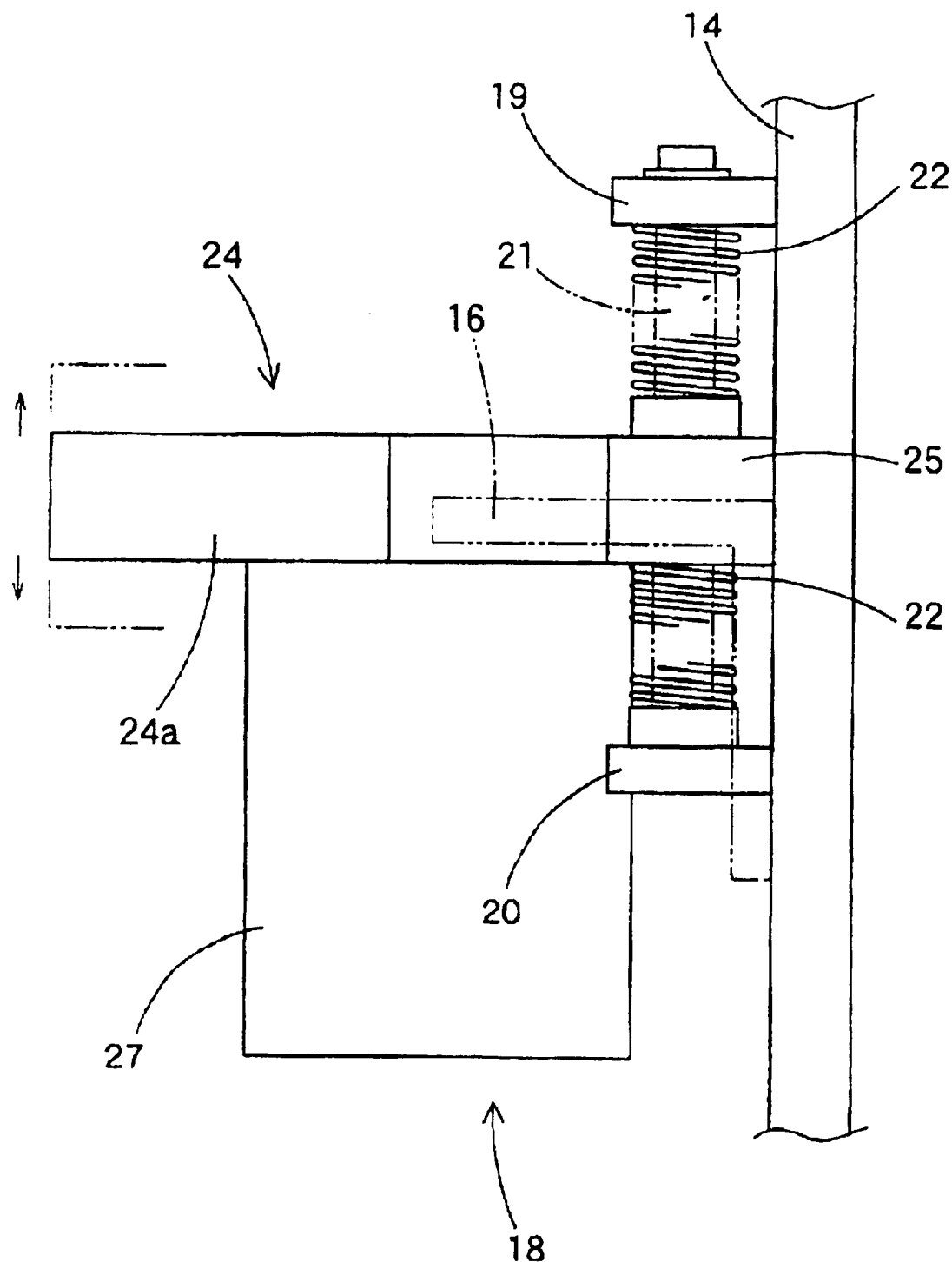
FIG. 5 is a schematic side view of the example dresser of FIG. 1.

As shown in FIGS. 1 and 2, an example servo gun 5 is installed in a front end of an arm 2 of a multi-joint welding robot 1. The servo gun of FIGS. 1 and 2 includes a pair of electrode tips 11 and 12 inserted into shanks 7 and 8 facing each other. The servo gun 5 is a widely used apparatus, and is configured to have a position control function to move the electrode tips 11 by means of a servo motor 6 with a built-in encoder such that the pair of electrode tips 11 and 12 equally approach a predetermined center reference position C0 (refer to FIGS. 11 and 12). Additionally, the servo gun 5 has an operation function to perform revolution control/torque control, thereby performing a position control or a pressure control of the electrode tip 11. Here, the term "revolution" means the number of rotations.

Meanwhile, in the illustrated servo gun 5, while the shank 8 installed in an unmovable state can be equally approached to the shank 7 by the position control function, a position control of less than about 1 mm is impossible individually.

Additionally, the device of FIG. 1 includes a control unit 3 for controlling the servo gun 5, a dresser 18 and a tip adhering unit (not shown) of the welding robot 1. Reference symbols W1 and W2 represent processing sites on a welding line where the welding robot 1 performs a welding process. At the processing sites W1 and W2, metal plates P1 and P2 are connected with each other by performing the spot welding at predetermined times and predetermined portions.

As shown in FIGS. 1 and 3 to 5, the dresser 18 is supported by a support frame within an operation range of the servo gun 5 by an operation of the welding robot 1. The dresser 18 includes brackets 19 and 20 connected fixedly to the support frame 14 at upper and lower portions of a rear side. Guide rods 21 are installed at right and left sides in a vertical; position and up and down between the brackets 19 and 20. At the approximate center position of the guide rods 21, a guide block 25 in the rear portion of a dresser body 24 is installed slidably upward and downward along an axial direction of the guide rods 21. Additionally, upper and lower surfaces of the guide block 25 are in contact with four compression coil springs 22 externally installed around the guide rods 21. The dresser body is supported by the support frame 14, so that the dresser body 24 is movable along an axial direction of the electrode tips 11 and 12 due to an elasticity of the springs 22 during the grinding process.

The dresser body 24 includes a servo motor 27, a cutter 30 for grinding the electrode tips 11 and 12, and a tip extracting unit 32 for extracting the electrode tips 11 and 12 from the shanks 7 and 8.

The cutter 30 is installed in a holder 29 having a round ring shape so that it is rotatable around a rotating axis which is upward and downward. The cutter 30 includes concave blades 30a and 30c (refer to FIG. 11) for grinding front ends of the electrode tips 11 and 12.

The holder 29 exposes a circumference of the cutter 30 from a case 24a to be rotatable within the case 24a of the dresser body 24. Additionally, the holder 29 includes a gear part at an outer circumference meshed with a mid gear 28 rotatably installed in the case 24a. The mid gear 28 is meshed with a gear 27b fixed to a rotation driving shaft 27a of the servo motor 27 (see FIG. 4).

Accordingly, when the servo motor 27 operates, the cutter 30 rotates around the upward and downward rotating axis through the gear 27b of the driving shaft 27a, the mid gear 28 and the holder 29. Meanwhile, an operation of the servo motor 27 is controlled by the control unit 3.

The tip extracting unit 32 extracts the electrode tips 11 and 12 from the shanks 7 and 8 using three teeth 45, based on the fact that the electrode tips 11 and 12 installed in the taper-shaped shanks 7 and 8 whose ends become thin are easily extracted if they rotate somewhat in a circumference direction. As shown in FIGS. 6, 7 and 16 to 19, the extracting unit 32 includes a rotary-motion base 47, a holding member 40, upper and lower plates 33 and 34, press rings 36, and braking plate 38, in addition to the three teeth 45.

The rotary-motion base 47 rotates the teeth 45 towards an invasion area (shown in FIGS. 18 and 19) for the purpose of holding the tips 11 and 12 or an exiting area (shown in FIG. 16) for the purpose of preventing an interference of the tips 11 and 12. The rotary-motion base 47 is formed in a round ring shape, in which an insertion hold 47a fitting and passing the electrode tips 11 and 12 at the center are formed in the vertical direction. Concave portions 47b receiving the teeth 45 are formed at a circumference of the insertion hole 47a. Additionally, an invasion pressing plate 47c (refer to FIG. 17) is formed at an inner circumference surface of each concave portion 47b to press the teeth 45 toward the invasion area in a clockwise direction at the rotation of the rotary-motion base 47, and an exiting pressing surface 47d (refer to FIG. 19) is formed at an inner circumference surface of each concave portion 47b to press the teeth 45 toward the exiting area in a counterclockwise direction at the rotation of the rotary-motion base 47. A gear portion 47e meshed with the mid gear 28 is formed at an outer circumference surface of the rotary-motion base 47. Further, three penetrating holes 47g penetrating in vertical directions are formed between the concave portions 47b of the rotary-base base 47. Each penetrating hole 47g receives a spacer 43 (which will be described later), and is formed in an arc shape in order to prevent interference with the spacer 43. Furthermore, a cylindrical rib 47f is protrudedly formed near the outer circumference of the upper and lower surfaces of the rotary-motion base 47.

The rotary-motion base 47 is received in a meshed state with the mid gear 28 at circularly opened receiving holes 33a and 34a of upper and lower plates 33 and 34. At the same time, the rotary-motion base 47 is rotatably maintained at the upper and lower plates 33 and 34 by regulating the upper and lower surfaces of the gear portion 47e by using the press rings 36 fixed to the upper and lower plates 33 and 34. The upper and lower plates 33 and 34 are fixed to the case 24a.

Each of the teeth 45 is provided with a body 45a formed in a shape of a rectangular plate, and a support shaft 45g installed protrudedly around a middle of the upper and lower surfaces of the body 45a. A front end 45b of the body 45a is formed sharply in order for an easy penetration into the outer circumference surface of the electrode tips 11 and 12.

The holding member 40 rotatably maintains the teeth 45 in each concave portion 47b of the rotary-motion base 47 around the center of the support shaft 45g, in which two disk-shaped plates 41 and 42 and three cylinder-shaped spacers 43 with screw hole 43a are connected with six connection bolts 44.

Each of the plates 41 and 42 includes insertion holes 41a and 42a at the center, which are penetrated in vertical directions and through which the electrode tips 11 and 12 can be insertedly passed. The plates are regulated with the inner circumference surface of the rib 47f of the rotary-motion base 47 and installed rotatably with respect to a central axis X of the rotation. Additionally, three support holes 41b and 42b and three installation holes 41c and 42c are radially formed to face each other around the insertion hole 41a and 42a. Each support hole 41b and 42b receives the upper and lower support shafts 45g of each tooth 45 and supports the teeth 45 rotatably. Additionally, each installation hole 41c and 42c has a step. Each connection bolt 44 is connected to the screw hole 43a of the spacer 43 inserted into each penetrating hole 47g of the rotary-motion base 47, so that head portions of the connection bolts 44 contact with the stepped portions of the installation holes 41c and 42c. If a vertical length of each spacer 43 is somewhat longer than that of the penetrating hole 47g of the rotary-motion base 47, the upper and lower sectional surfaces contact with the circumferences of the installation holes 41c and 42c and the holding member 40 provided with the plates 41 and 42 connected by means of the connection bolts 44 is installed rotatably around the central axis of rotation with respect to the rotary-motion base 47.

The braking plate 38 is pressed and contacted with the outer circumference surface of the plate 41 by the springs (not shown). The braking force applied to the plates 41 by the braking plate 38 is set to a value at which the holding member 40 can rotate together with the rotary-motion base 47, in which the support shaft 45g of the teeth 45 is pressed when an invasion resistance is increased to some degree due to a penetration of each of the teeth 45 into the electrode tips 11 and 12 according to a counterclockwise rotation of the rotary-motion base 47.

Additionally, a grinding reference plate 16 (which can be in contact with the electrode tip 11) is installed in the support frame 14 within the operation range of the servo gun 5 due to an operation of the welding robot 1.

Hereinafter, there will be described an example method for grinding the electrode tips 11 and 12 using the servo gun 5 or the dresser 18. Meanwhile, the control unit 3 controls servo motors of multi-joint portions of the welding robot 1, the servo motors 6 and 27 of the servo gun 5 and the dresser 18, and the like.

In this example, the electrode tips 11 and 12 are grinded by a spot welding reference position detecting process, a welding process, a total consumption amount detecting process, a one-side consumption amount detecting process, an other-side consumption amount detecting process, a grinding reference position calculating process, a rough finishing process, a finishing grinding process, a total grinding amount detecting process, a one-side grinding amount detecting process, an other-side grinding amount detecting process, and a tip replacing process.

Figure 8:
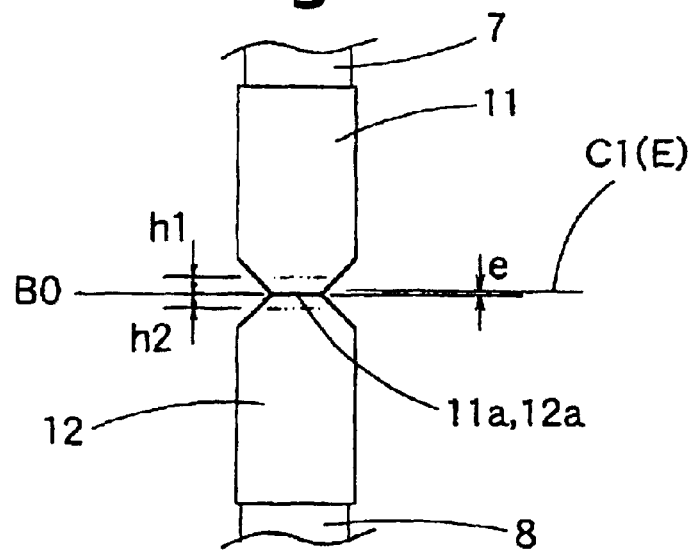
FIG. 8 illustrates an example spot welding reference position.

First, the spot welding reference position detecting process detects an absolute spot welding position of a pair of electrode tips 11 and 12 installed in the servo gun 5 before the welding process. Meanwhile, in the welding robot 1 set in a standby position, a state in which front ends 11a and 12a of the electrode tips 11 and 12 are in contact with each other under a predetermined pressure as shown in FIG. 8 is considered as an absolute spot welding reference position B0 of the electrode tips 11 and 12. The spot welding reference position B0 is also a teaching reference of the welding robot 1. In reference of the spot welding reference position B0, an arranged position and a pressure of the electrode tips 11 and 12 at the processing sites W1 and W2 are controlled. Further, a grinding operation and a tip replacing operation at an arranged portion of the dresser 18, which will be described later, are also controlled.

After the detection of the spot welding reference position B0, the control unit 3 is informed of the welding process, the grinding process and the tip replacing process. Then, the welding robot 1 carries out the welding process.

Figure 9:
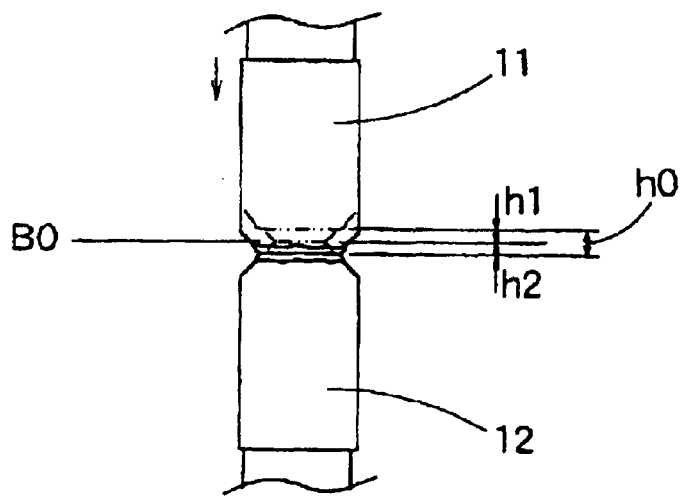
FIG. 9 illustrates an example process of detecting a total consumption amount.

During the welding process, the total consumption amount detecting process is performed after the predetermined number of spot welding. In the total consumption amount detecting process, as shown in FIG. 9, the pair of electrode tips 11 and 12 return to the spot welding reference position B0 and then the servo motor 6 of the servo gun 5 is operated, thereby contacting one electrode tip 11 with the other electrode tip 12.

At this time, since the electrode tips 11 and 12 are being consumed in reference of the spot welding reference position B0 before the welding process, the electrode tip 11 moves as much as a total consumption amount h0. Therefore, the total consumption amount h0 of the electrode tips 11 and 12 can be detected if an encoder detects the movement amount. In FIG. 9, reference symbols h1 and h2 represent the consumption amount of the electrode tips 11 and 12, respectively.

Figure 10:
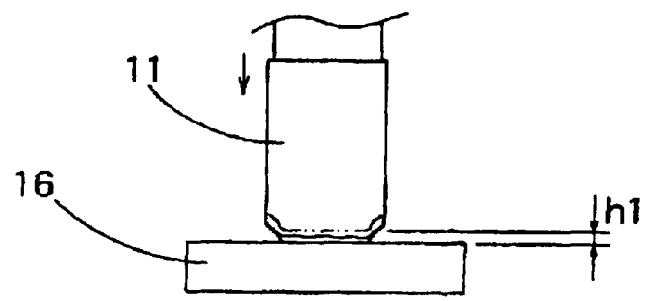
FIG. 10 illustrates an example process of detecting a one-side consumption amount.

Then, the one-side consumption amount detecting process is performed. In this process, the servo gun 5 is installed in a position of the grinding reference plate 16 to operate the servo motor 6. As shown in FIG. 10, the electrode tip 11 contacts with the grinding reference plate 16.

At this time, since the electrode tip 11 is consumed in reference of the spot welding reference position B0, the electrode tip 11 moves much more by the consumption amount h1 of the electrode tip 11. The consumption amount h1 of the electrode tip 11 can be detected if the encoder detects the movement amount.

Then, the other-side consumption amount detecting process is performed. In this process, the control unit 3 subtracts the consumption amount h1 of the electrode tip 11 from the total consumption amount h0. The calculated value becomes the consumption amount h2 of the electrode tip 12.

Then, the grinding reference position calculating process is performed. In this process, when the electrode tips 11 and 12 return to the spot welding reference position B0, a center C1 between the front ends of the electrode tips 11 and 12 is calculated by an equation of (h1−h2)/2. A grinding reference position E in the grinding process at the center portion C1 is calculated. For example, as shown in FIG. 8, if h1=2 mm and h2=1 mm, then e=(h1−h2)/2, i.e., e=(2−1)/2=0.5. The center portion C1 is placed higher than the spot welding reference position B0 by the value "e", i.e., 0.5 mm.

Figure 11:
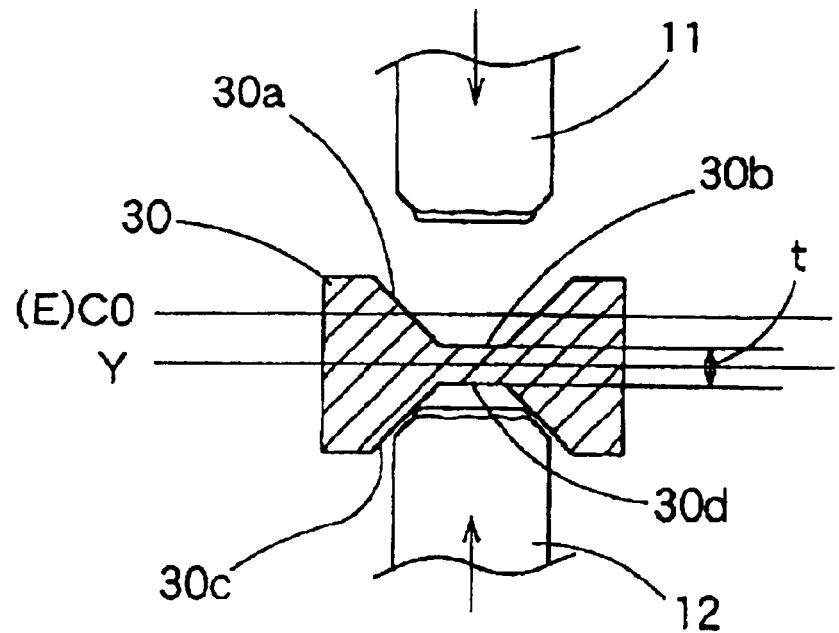
FIG. 11 illustrates an example rough finishing process.
Figure 12:
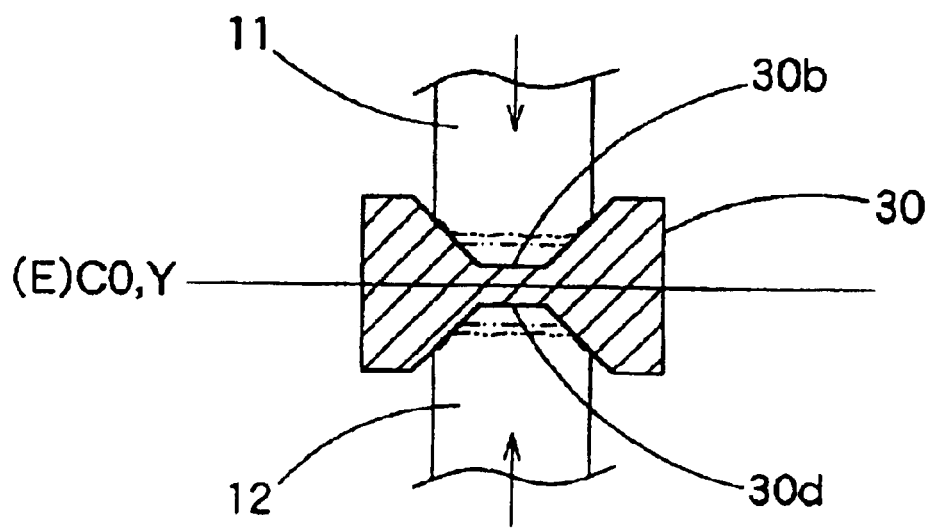
FIG. 12 illustrates an example state when the rough finishing process is completed.

Then, the rough finishing process is performed. In this process, the grinding reference position E is set to the center reference position C0 and the servo gun 5 is installed at a position at which the electrode tips 11 and 12 can be grinded with both sides of the cutter 30 of the dresser 18. Additionally, as shown in FIGS. 11 and 12, the position control function of the servo gun 5 is operated to rotate the cutter 30. The rough finishing process to the electrode tips 11 and 12 is carried out by equally approaching the pair of electrode tips 11 and 12 to the center reference position C0 and then separating them from each other as much as a thickness t of the cutter 30. The thickness t of the cuter 30 is a distance between the bottom portions 30b and 30d of the blades 30a and 30c of the cutter 30.

In the rough finishing process, although the set center reference position C0 is set accurately to a center position Y in a thickness direction of the cutter 30 of the dresser 18, the dresser body 24 itself is arranged movably in an axial direction of the pair of electrode tips 11 and 12 due to the coil spring 22. Therefore, the dresser body 24 moves when the electrode tips 11 and 12 are approached to each other, and the center position Y of the thickness direction of the cutter 30 is placed at the center reference position C0 as the grinding reference position E when completing the rough finishing process.

Additionally, if the consumed electrode tips 11 and 12 move equally toward the center reference position C0 and are approached by the thickness t of the cutter 30, the dresser body 24 including the cutter 30 is arranged movably. Thus, although each consumption amount h1 and h2 of the electrode tips 11 and 12 is different from each other, the rough finishing process to the electrode tips 11 and 12 is carried out, thereby accurately reaching the bottom portions 30b and 30d of the blades 30a and 30c of both sides of the cutter 30.

Then, the finishing grinding process is performed. This process is carried out by operating the position control function of the servo gun 5, in which the cutter 30 is rotated to equally approach the pair of electrode tips 11 and 12 toward the center reference position C0 by a predetermined distance (e.g., 0.2 mm). Scratches occurring in the rough finishing process or black layers occurring the welding process are removed, and the shapes of the weldable front ends 11a and 12a can be accurately secured. Therefore, the process is performed with an increased revolution rate of the cutter 30 relative to the case of the rough finishing process. Additionally, the applied pressure toward the center reference position C0 of the tips 11 and 12 is lowered. Further, preferably, the finishing grinding process is performed through two or three stages by changing the revolution of the cutter 30 or changing the applied pressure of the tips 11 and 12 together with the revolution of the cutter 30. Preferably, in case the finishing grinding process is performed in stages, the revolution of the cutter 30 is equal or increased, and the applied pressure of the electrode tips 11 and 12 due to the servo motor 6 is lowered gradually. Furthermore, a distance in which the electrode tips 11 and 12 are approached can be controlled through a conversion into a grinding time by grinding them in a sampling manner.

In case of the welding robot 1, the revolution of the cutter 30 can be easily controlled with the servo motor 27 of the dresser 18 due to the control of the control unit 3. The rough finishing process and the finishing grinding process can be performed promptly and clearly. Additionally, together with the servo motor 6 of the servo gun 5, the servo motor 27 of the dresser 18 can be controlled by the control unit 3 of the welding robot 1 and combined in a program for the control unit 3 of the welding robot 1, thereby attributing a proper grinding of the electrode tips 11 and 12.

Meanwhile, if the finishing grinding process is completed, the electrode tips 11 and 12 are effectively grinded according to the consumption amount h1 and h2 of the electrode tips 11 and 12.

Figure 13:
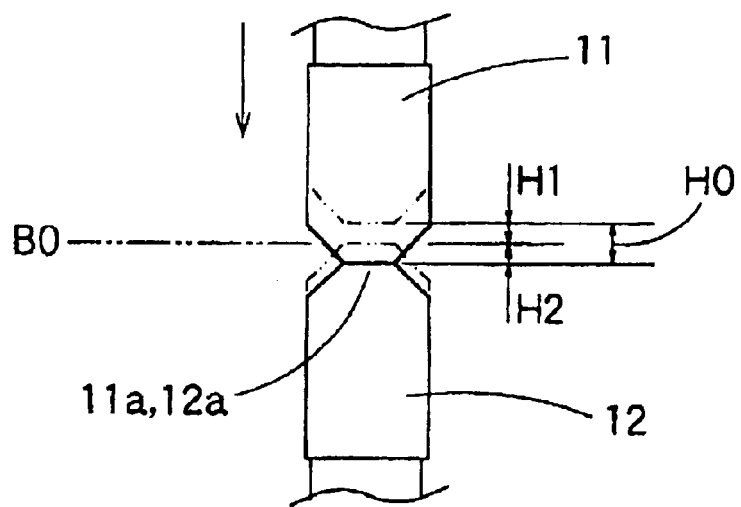
FIG. 13 illustrates an example process of detecting a total grinding amount.

In another example, the total grinding amount detecting process is performed after the finishing grinding process. In this process, as shown in FIG. 13, the pair of electrode tips 11 and 12 are returned to the spot welding reference position B0. Then, the servo motor 6 of the servo gun 5 is operated to contact one electrode tip 11 with the other electrode tip 12.

At this time, since each of the electrode tips 11 and 12 is grinded in reference of the spot welding reference position B0 before the welding process, the electrode tip 11 moves as much as the total grinding amount H0, and the total grinding amount H0 of the electrode tips 11 and 12 can be detected if the encoder detects the movement amount. Meanwhile, reference numerals H1 and H2 represent the grinding amount of the electrode tips 11 and 12, respectively.

Figure 14:
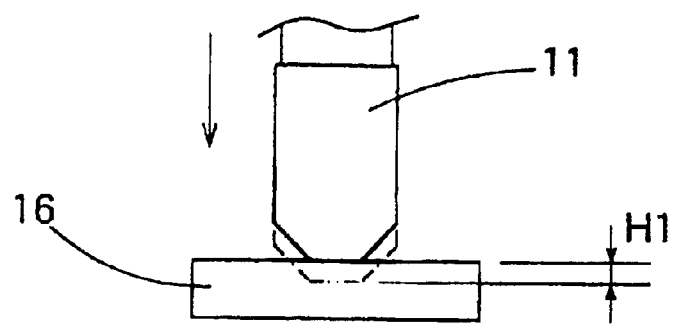
FIG. 14 illustrates an example process of detecting a one-side grinding amount.

Then, the one-side grinding detecting process is performed. The servo gun 5 is arranged at a position of the grinding reference plate 16 to operate the servo motor 6, and the electrode tip 11 is contacted to the grinding reference plate 16, as shown in FIG. 14.

At this time, since the electrode tip 11 is grinded in reference of the spot welding reference position B0, the electrode tip 11 moves much more by the grinding amount H1 of the electrode tip 11, and the grinding amount H1 of the electrode tip 11 can be detected if the encoder detects the movement amount.

Then, the other-side consumption amount detecting process is performed. In this process, the control unit 3 subtracts the consumption amount H1 of the electrode tip 11 from the total consumption amount H0. The result value becomes the consumption amount H2 of the electrode tip 12.

Figure 15:
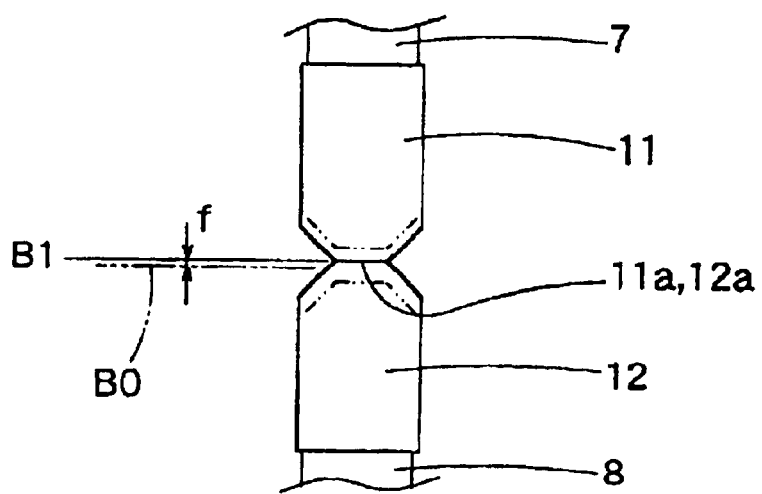
FIG. 15 illustrates an example welding reference position.

The control unit 3 calculates a variation amount with respect to the spot welding reference position B0 by using the detected grinding amount H1 and H2 of the pair of the electrode tips 11 and 12, and the welding reference position B1 at which the electrode tips 11 and 12 contact each other near the spot welding reference position B0 is set, as shown in FIG. 15.

In this example, when the electrode tips 11 and 12 return to the spot welding reference position B0, a center portion between the front ends of the electrode tips 11 and 12 is calculated by an equation of (H1−H2)/2. The center portion is set as the grinding reference position B1. For example, if H1=3 mm and H2=3 mm, then f=(H1−H2)/2, i.e., f=(3−2)/2=0.5. The center portion, that is, the welding reference position B1, is placed higher than the spot welding reference position B0 by the value "f", i.e., 0.5 mm.

An arrangement position and pressure of the electrode tips 11 and 12 at the process sites W1 and W2 are controlled in reference of the welding reference position B1. Meanwhile, the grinding process and the tip replacing process at the rear portion of the dresser 18 are controlled in reference of the welding reference position B0.

If the total grinding amount detecting process, the one-side grinding amount detecting process and the other-side grinding amount detecting process are performed after the finishing grinding process, each grinding amount H1 and H2 of the electrode tips 11 and 12 can be calculated accurately, so that the welding reference position B1 is set by the calculation using the grinding amount H1 and H2. A following welding process can be performed easily due to an easy regulation.

In another example, after the other-side consumption amount detecting process, if each consumption amount h1 and h2 of the pair of the electrode tips 11 and 12 is more than a predetermined value, the process of replacing the electrode tips 11 and 12 is further performed. For example, in case a total length of the electrode tips 11 and 12 before the welding process is 23 mm, the tips cannot be used when they become 17 mm long, i.e., when the consumption amount h1 and h2 is more than 6 mm. In that case, the electrode tips 11 and 12 are replaced. Meanwhile, since each consumption amount h1 and h2 is detected in reference of the early spot welding reference spot B0 even at the grinding process after several welding processes, a cumulative value of the consumption amount at each welding process is calculated. Therefore, in case each consumption amount h1 and h2 is less than a predetermined value, the grinding reference position detecting process is performed without the tip replacing process.

The example tip replacing process includes a tip extracting process and a tip attaching process.

Figure 6:
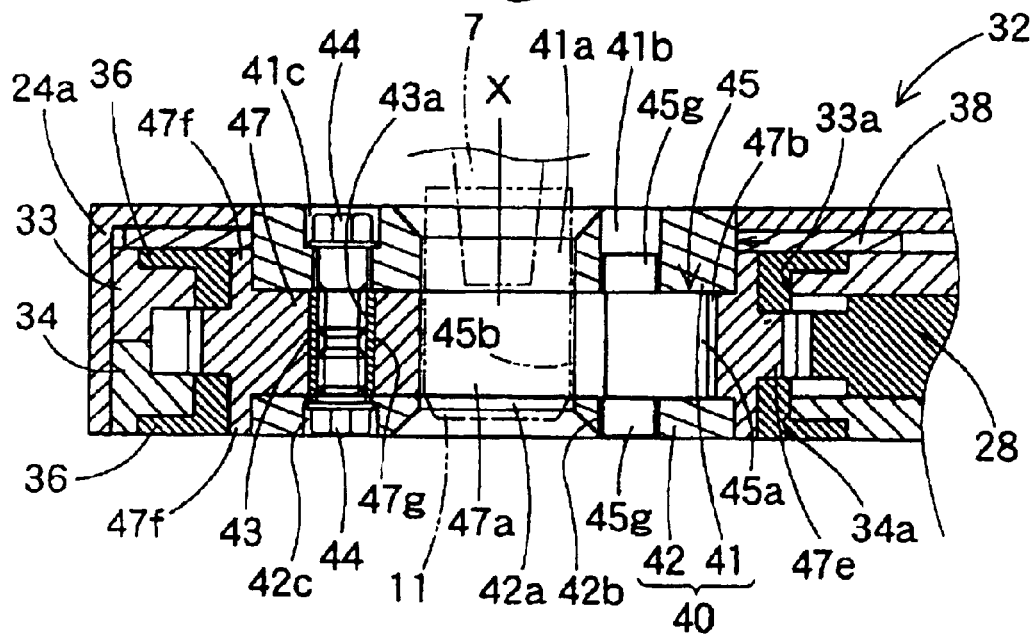
FIG. 6 is a sectional view of an example tip extracting unit, taken along the line VI—VI of FIG. 3.
Figure 7:
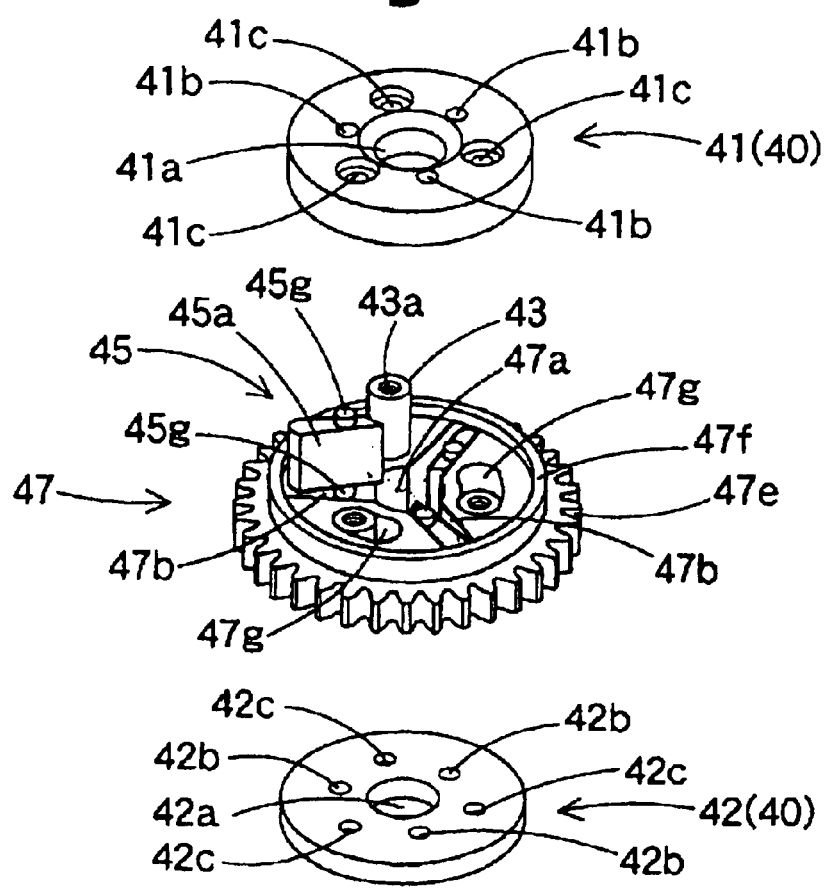
FIG. 7 is an exploded perspective view of main parts of the example tip extracting unit.

In the example tip extracting process, the control unit 3 controls the servo motors 6 and 17 of the welding robot 1, the servo gun 5 and the dresser 18. As shown in FIG. 6, the electrode tip 11 is inserted into the insertion holes 41a, 42a and 47a of the holding member 40 and the rotary-motion base 47 of the tip extracting unit 32 of the dresser 18.

Figure 16:
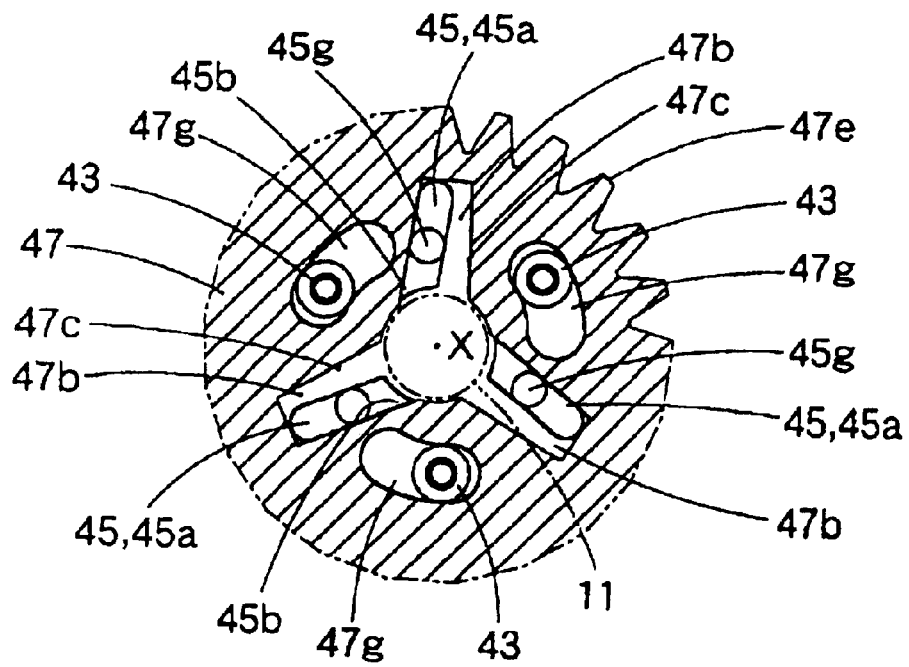
FIG. 16 is a cross-sectional view showing an example initial state in an example tip extracting process.
Figure 17:
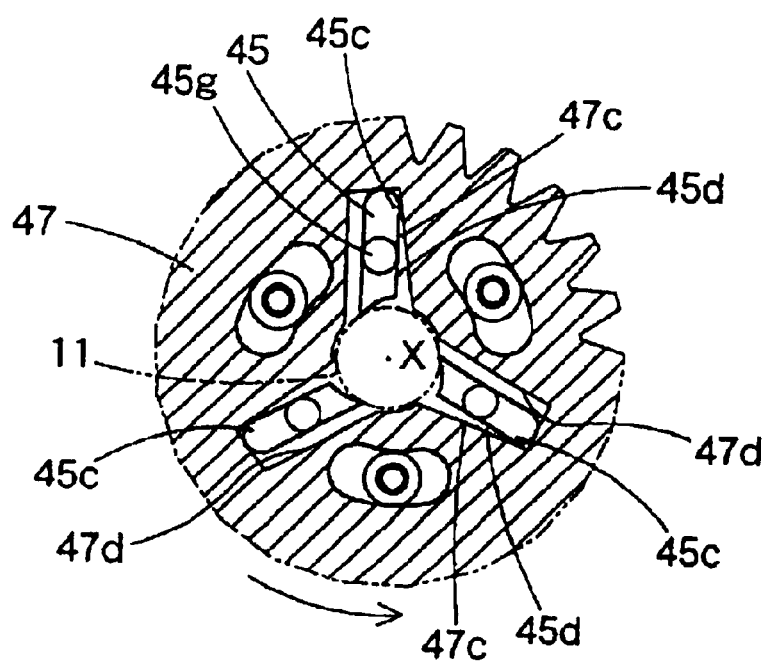
FIG. 17 is a cross-sectional view showing an example state when a rotary-motion base rotates in the example tip extracting process.
Figure 18:
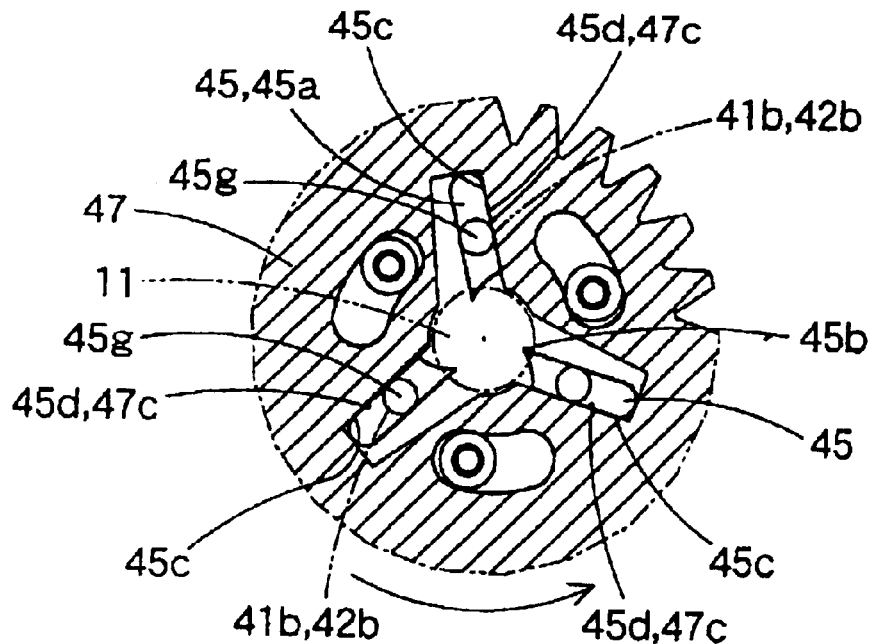
FIG. 18 is a cross-sectional view showing an example state just before a holding member rotates in the example tip extracting process.

Then, the control unit 3 operates the servo motor 27. As shown in FIGS. 16 to 18, using the mid gear 28, the rotary-motion base 47 is rotated by a predetermined angle (in the illustrated example, about 20°) in a counterclockwise direction in reference of the central axis X of the rotation.

As shown in FIGS. 16 and 17, each invasion pressing surface 47c of the rotary-motion base 47 contacts with a convex portion 45c or a side surface 45d of each tooth 45, so that the teeth 45 are rotated in a counterclockwise direction in reference to the rotation center of the support shaft 45g. Therefore, the teeth 45 are rotated to the invasion area, so that the front ends 45b of the teeth are penetrated into the outer circumference surface of the electrode tip 11 so that the electrode tips 11 can be maintained within the insertion hole 47a.

In this state, as shown in FIG. 18, if the rotary-motion base 47 is rotated much more in a counterclockwise direction, the front ends 45b of the teeth 45 are faced toward the central direction of the electrode tip 11 to thereby be penetrated toward the electrode tip 11 even more. Therefore, an invasion resistance of the teeth 45 is increased. If so, the rotation of the teeth 45 is difficult so that its rotation is stopped. A rotation torque of the rotary-motion base 47 is operated to the inner circumference surface of the support holes 41b and 42b provided in the plates 41 and 42 of the holding member 40 through the support shaft 45g of the teeth 45, so that the holding member 40 is rotated in a counterclockwise direction together with the rotary-base 47 due to a braking force of the braking plate 38.

At this time, the holding member 40 makes the teeth 45 penetrate into the electrode tip 11, so that the electrode tip 11 is rotated within the insertion hole 47a. Therefore, the electrode tip 11 is rotated in a counterclockwise direction together with the rotary-motion base 47. If the electrode tip 11 is rotated somewhat, the taper-shaped shank 7 and the electrode tip 11 are released.

Therefore, after a rotation of a predetermined angle (e.g., about 20°), the electrode tip 11 is extracted from the shank 7 by moving the shank 7 upward.

Figure 19:
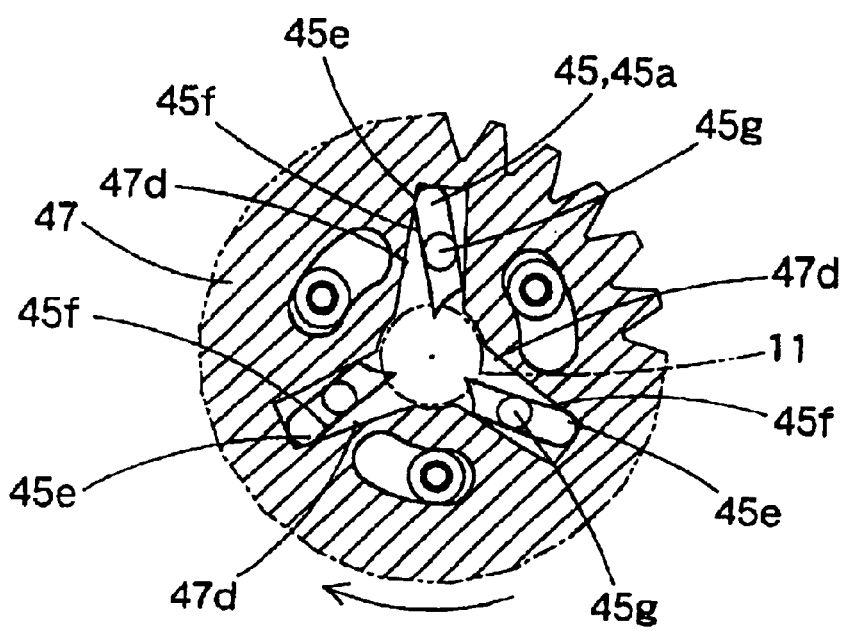
FIG. 19 is a cross-sectional view showing an example state when a rotary-motion base rotates in a reverse direction.

Then, as shown in FIG. 16, after moving the servo gun 5 in a lateral direction, the rotary-motion base 47 is reversely rotated about 20° in a clockwise direction in reference to the central axis X of the rotation by rotating the servo motor 27 in a reverse direction, thereby returning to the initial state. If so, as shown in FIG. 19, each extracting pressing surface 47d of the rotary-motion base 47 contacts with the convex portion 45e or the side surface 45f of the teeth 45. The teeth 45 are rotated around the support shaft 45g in a clockwise direction, and the front end 45b of each tooth 45 is arranged in the exiting area to release the electrode tip 11 in the insertion hole 47a.

Then, the electrode tip 11 is released from the invasion of the front end 45b and separated from the insertion hole 47a of the rotary-motion base 47, so that it can be received in a collecting box (not shown).

Meanwhile, since a reverse of the rotary-motion base 47 is a rotation in a direction in which an invasion resistance of the teeth 45 is decreased and a braking force of the braking plate 38 is applied to the holding member 40, the rotation does not occur and only the teeth 45 are rotated to the exiting area under the reverse of the rotary-motion base 47.

Additionally, the electrode tip 12 of the lower shank 8 is inserted into the insertion holes 41a, 42a and 47a of the holding member 40 and the rotary-motion base 47. As described above, after rotating the rotary-motion base 47 in a counterclockwise direction, the servo gun 5 is moved in order to move the shank 8 downward and laterally. If the rotary-motion base 47 is rotated in a clockwise direction, the electrode tip 12 is received in the collecting box (not shown) like the electrode tip 11.

Thereafter, in the tip attaching process, the control unit 3 moves the servo gun 5 to a tip attaching unit (not shown) to fix new electrode tips into the shanks 7 and 8. By doing so, the tip replacing process is completed. After the tip replacing process, a next welding process is performed. After performing a spot welding several times, the total consumption amount detecting process to the grinding process are performed.

In this manner, if the tip replacing process can be performed after the other-side consumption amount detecting process, the replacement of the electrode tips 11 and 12 is automatically possible during the welding process, thereby achieving an effective welding process.

Meanwhile, in the illustrated example, the dresser 18, which includes the tip extracting unit 32 and the servo motor 27 used in the grinding process, is commonly used in the tip extracting process, thereby decreasing the number of elements used in the welding process at the welding line. At the same time, space around the welding robot 1 can be widened.

Further, in this example, although the spot welding reference position B0 is set in a state that the electrode tips 11 and 12 contact with each other, the spot welding reference position B0 can be provided in different types. A state in which a plate for the spot welding is installed between the front ends 11a and 12a, or a state in which a predetermined reference plate is interposed therebetween can be the spot welding reference position B0.

From the foregoing, persons of ordinary skill in the art will appreciate that a welding robot for spot welding, which is capable of grinding each electrode tip rapidly and clearly has been provided. In a disclosed example, the welding robot includes: a servo gun provided at a front end of a multi-joint arm, wherein a pair of electrode tips for the spot welding are installed; a control unit for controlling a servo motor of the servo gun in a welding process or a grinding process of the electrode tips; and a dresser for grinding the pair of the electrode tips. The dresser is provided with a servo motor for rotating a grinding cutter. The control unit controls a revolution of the servo motor of the dresser and controls the servo motor of the servo gun in order to adjust a pressure of the pair of the electrode tips installed in the servo gun with respect to the cutter. In a finishing grinding process to the pair of the electrode tips, the control unit controls the servo motors of the servo gun and the dresser to increase the revolution of the cutter and to reduce a pressure to the cutter much more than a rough finishing process.

The dresser rotatably drives the cutter due to the servo motor which is capable of controlling the revolution. The electrode tips are grinded while the control unit controls the pressure of the electrode tips properly in the rough finishing process and the finishing grinding process, and controls the revolution of the cutter. At this time, the control unit controls the servo motors of the servo gun and the dresser to increase the revolution of the cutter in the finishing grinding process of the electrode tips much more than the rough finishing process and to reduce the pressure on the cutter, thereby grinding the electrode tips promptly and clearly.

Additionally, together with the servo motor of the servo gun, the servo motor of the dresser can be controlled by the control unit of the welding robot and combined in a program for the control unit of the welding robot, thereby properly grinding the electrode tips.

What is claimed is:

1. A welding robot for spot welding, comprising:

a servo gun provided at a front end of a multi-joint arm, wherein a pair of electrode tips for the spot welding are installed;

a control unit for controlling a servo motor of the servo gun in a welding process or a grinding process of the electrode tips; and a dresser for grinding the pair of the electrode tips, the dresser including a servo motor for rotating a grinding cutter, wherein the control unit controls the servo motor of the dresser and controls the servo motor of the servo gun in order to adjust a pressure of the pair of the electrode tips installed in the servo gun with respect to the cutter, and the control unit controls the servo motors of the servo gun and the dresser in a finishing grinding process to the pair of the electrode tips to increase the revolution of the cutter and reduce a pressure to the cutter relative to the revolution and pressure of the cutter during a rough finishing process.

* * * * *